Nov. 13, 1951 — A. B. FUHR — 2,575,266
SCREEN WINDOW STRUCTURE
Filed Feb. 21, 1946 — 3 Sheets-Sheet 1
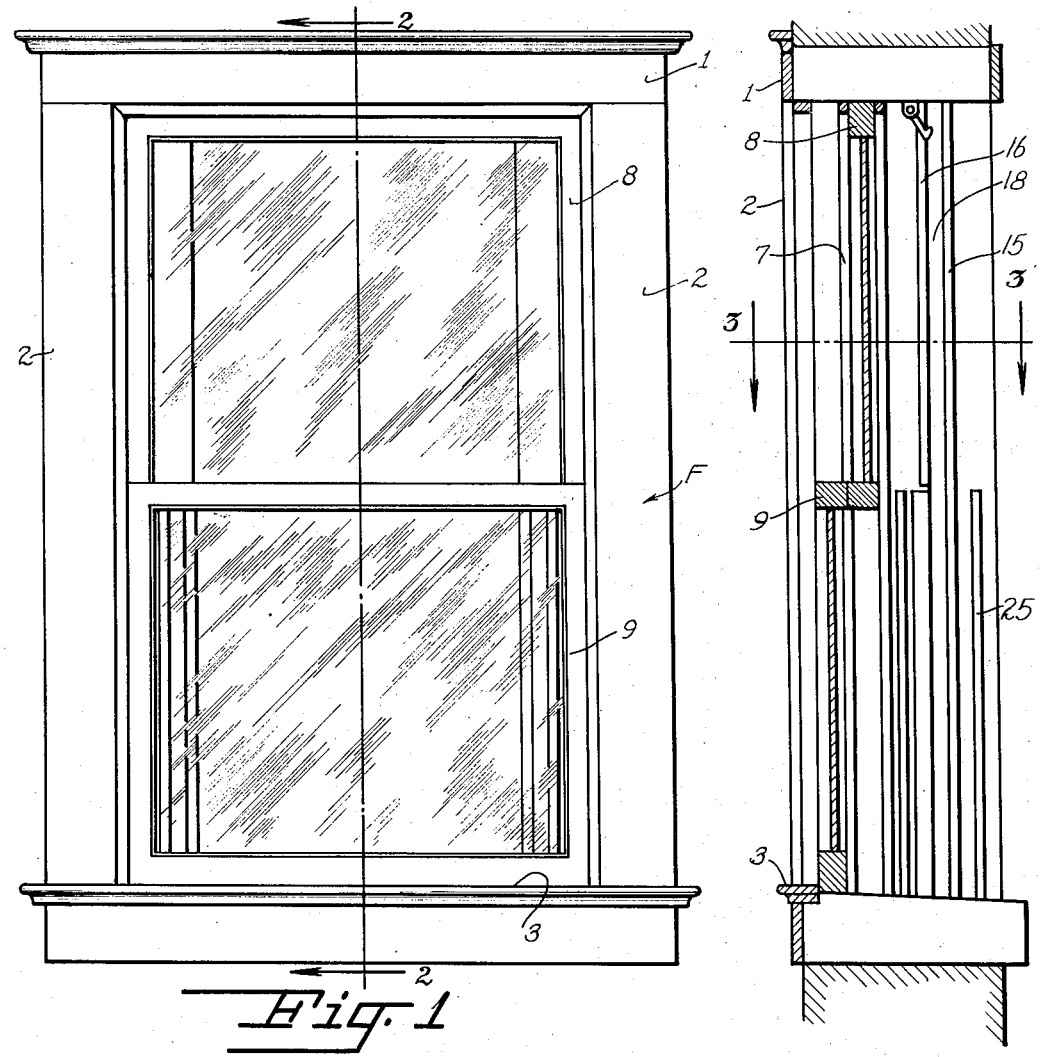
Fig. 1
Fig. 2
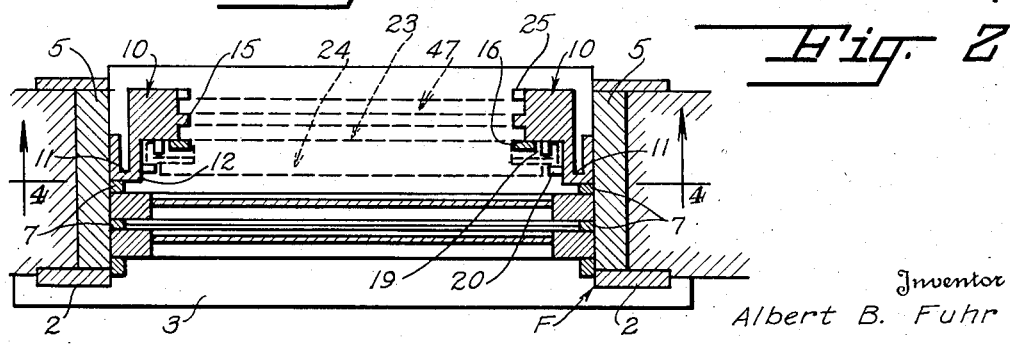
Fig. 3
Inventor
Albert B. Fuhr
By Wilfred E. Lawson
Attorney Nov. 13, 1951     A. B. FUHR     2,575,266
SCREEN WINDOW STRUCTURE
Filed Feb. 21, 1946     3 Sheets-Sheet 2

Inventor
Albert B. Fuhr
By Wilfred E. Lawson
Attorney

Nov. 13, 1951 A. B. FUHR 2,575,266
SCREEN WINDOW STRUCTURE
Filed Feb. 21, 1946 3 Sheets—Sheet 3
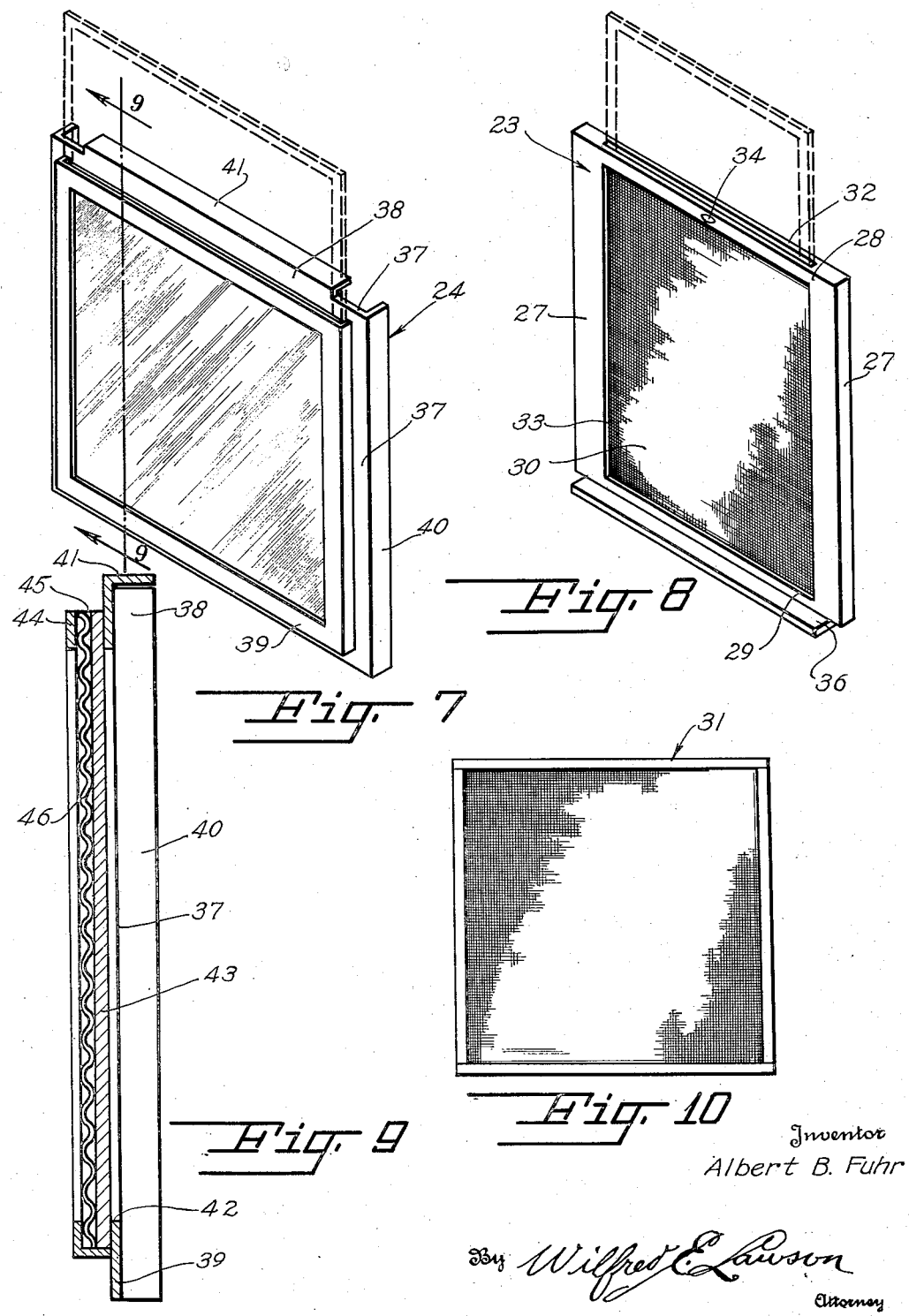
Inventor
Albert B. Fuhr
By Wilfred E. Lawson
Attorney Patented Nov. 13, 1951

2,575,266

UNITED STATES PATENT OFFICE 2,575,266

SCREEN WINDOW STRUCTURE

Albert B. Fuhr, Macomb, Ill.

Application February 21, 1946, Serial No. 649,179

3 Claims. (Cl. 20—52)

This invention relates generally to improvements in window screen constructions and is directed particularly to an improved screen structure which is designed to be installed permanently in a window frame either upon the inner or the outer side of the window sash.

A primary object of the present invention is to provide a window screen construction which is installed permanently in a window frame and which includes screen frames of a novel design by which the screen fabric may be changed for an impervious sheet of material such as cellophane or the like, whereby the structure may be converted into a permanently installed storm sash structure.

Another object of the invention is to provide a window frame installation having removable sliding frame units which may be easily and quickly placed in position from the inner side of the window and which, when in position, are in interconnected relation at the meeting rails whereby there is formed a dust tight joint.

Still another object of the invention is to provide, in a window, a structure designed to be installed in the window frame either upon the inner side or upon the outer side of the regular double hung sash, which structure is provided with a novel arrangement of guide strips with which may be slidably connected screen frames in such a manner as to form tight dust proof joints which, when the screen frames have the screen fabrics thereof replaced by a suitable air impervious transparent panel, provides a tight dust proof joint which, while allowing light to pass through the window, prevents the passage of atmospheric dust.

Still another object of the invention is to provide in a window screen structure of the character referred to, means for placing in position from the inner side of the window frame, the upper screen frame by inserting the latter from the lower part of the window and then moving it upwardly, into place and then placing the lower screen frame in the upper part of the structure through the top of the window and shifting it downwardly into position, the upper and lower screen frames being designed to have overlapping flanges at their meeting edges whereby to form a tight joint.

A more specific object of the invention is to provide in a window screen structure designed for permanent installation in a window frame, novel sliding screen frame units having side by side duplicate frame portions which are permanently coupled together at their bottom edges and which may be slightly separated so that a section of screen fabric may be inserted or a section of air impervious transparent material such as cellophane or the like may be placed in position therein for winter protection, resilient holders or clip members being applied to the side and top edges of the screen frame unit to maintain the two duplicate parts firmly coupled together.

Other objects and advantages of the invention will become apparent as the description of the same proceeds and the invention will be best understood from a consideration of the following detailed description taken in connection with the accompanying drawings forming a part of the specification, with the understanding, however, that the invention is not confined to a strict conformity with the showing of the drawings but may be changed or modified so long as such changes or modifications mark no material departure from the salient features of the invention as expressed in the appended claims.

In the drawings:

Figure 1 is a view in elevation of a window, viewed from the inside and showing the present invention installed therein.

Figure 2 is a vertical section taken on the line 2—2 of Figure 1 with the auxiliary sashes removed.

Figure 3 is a transverse section on the line 3—3 of Figure 2.

Figure 7 is a view in perspective of the lower auxiliary sash.

Figure 8 is a view in perspective of the upper auxiliary sash.

Figure 9 is a vertical section on the line 9—9 of Figure 7 showing the screen panel replaced by a glass panel.

Figure 10 is a view in perspective of a screen panel as prepared for installation into an auxiliary sash.

Figure 4:
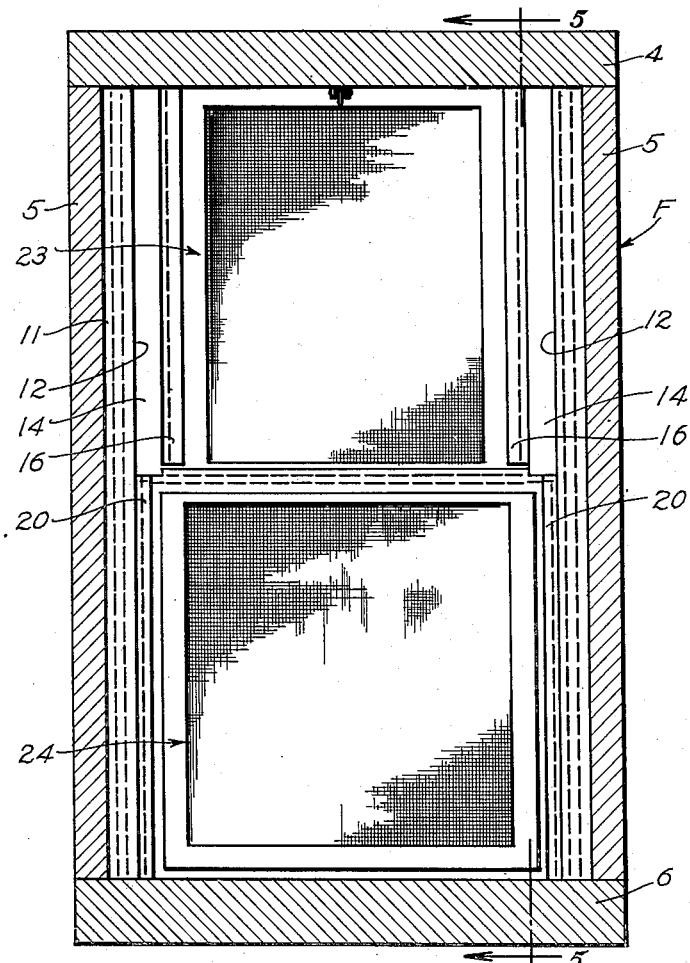
Figure 4 is a vertical section on the line 4—4 of Figure 3.

Referring now more particularly to the drawings Figure 1 illustrates a window structure of ordinary design, the same being viewed from the inside, the top and side trim plates being designated 1 and 2 respectively while the sill is designated 3. In accordance with the usual construction these trim plates are secured to the top and side members 4 and 5 respectively of the window frame structure and the sill 3 is joined to the bottom member 6 of the frame.

Within the frame structure, generally designated "F," are the usual parting stops 7 between which are slidably mounted the upper and lower window sash 8 and 9 respectively.

In accordance with the present invention there are secured within the window frame, preferably upon the outer sides of the sash 8 and 9 where the invention is installed in a double hung window structure, the vertical auxiliary frame bars or standards each of which is generally designated 10.

Each of the auxiliary members or standards 10 is formed to provide the relatively narrow wall 11 which is closely adjacent to the outermost one of the parting stops and which has its wide inner face parallel with the adjacent sash. Integral with the narrow forwardly facing wall 11 of each vertical member 10, is the inwardly directed or facing wall portion 12, the width of which extends or lies in a plane perpendicular to the forwardly facing wall 11. This inwardly facing wall portion 12 merges at the rear edge or that edge nearest the outer side of the window frame, with the inwardly directed portion 13, the width of which parallels the first mentioned wall 11 thereby providing the forwardly directed face or surface 14.

Figure 6:
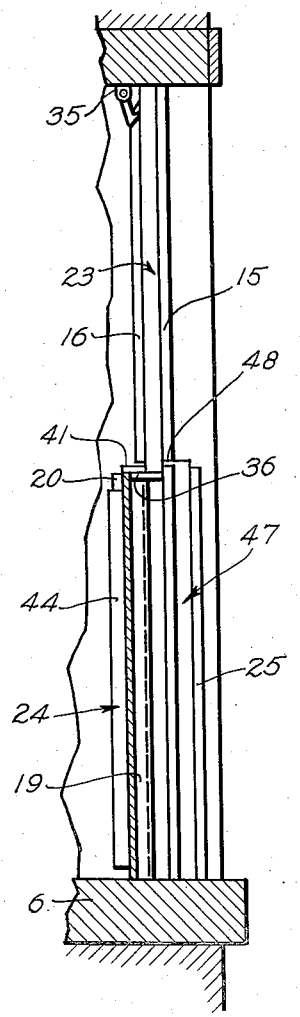
Figure 6 is a detail perspective of the central part of one vertical member showing the relative positions of the channel forming strips.

That face of the wall portion 13 which is directed inwardly from the adjacent side portion 5 of the window frame carries substantially at the longitudinal center thereof the longitudinal parting strip 15 and co-operating with this strip 15 through the upper half of the auxiliary frame member 10, is the guide flange 16 which sets forwardly slightly from the face of the wall surface 14, thereby forming a forwardly directed relatively wide channel 17. This flange 16 which extends through the upper half of the length of the auxiliary frame member 10 also forms, with the upper part of the strip 15, an upper guide channel 18 which is designed to receive an edge of a screen frame, as hereinafter described, and which is of a length substantially equal to the height of such screen frame. This guide channel 18 receives an edge of the upper screen frame of the completed structure and, as is shown in Figure 6, the lower half of such channel is open upon the forward side of the structure.

In referring to the forward and back or rear side of the structure reference is had to the parts of the window which are ordinarily referred to as the inner and outer sides, for the purpose of distinguishing from those parts of the auxiliary frame structure which are directed toward the center of the window frame and which are described as being directed inwardly. Accordingly where use is made of the term inwardly in describing the direction in which a part of the structure extends, it is meant that such part is directed toward the center of the frame structure and where a part is described as being directed forwardly or rearwardly it will be understood that reference is had respectively to that side of the frame which is inside the room or the side of the frame which is outside the room or the building wall in which the window is set.

As previously described the lower end of the flange 16 terminates at approximately the horizontal center of the frame, extending through the upper half only of the same to provide a guide channel, closed upon its inner and outer sides, for the hereinafter described upper screen frame.

Extending from the horizontal plane of the lower end of the guide strip 16, or from slightly below such plane, and disposed in the center of the forwardly directed wall face 14, is a forwardly projecting guide strip 19 which extends downwardly to the bottom member 6 of the window frame.

Cooperating with the guide strip 19 which is fixed against the face 14, is an inwardly directed guide strip 20 which lies in a plane perpendicular to the plane of the strip 19 and which is fixed to the center of the inwardly directed wall face or surface 12. This strip 20 also extends from the horizontal center of the window frame downwardly to the lower part 6 thereof and it lies in a plane which passes across and is spaced from the forward edge of the strip 19 and overlies the forward edge of such strip, thereby forming the narrow slot 21 which leads into the guide space 22.

From the foregoing it will be readily seen that the vertical auxiliary window frame members 10 are formed to provide the upper inwardly directed screen frame guide channels 18 which extend through the length of the upper half of the window structure, and inwardly from these channels there are provided through the length of the lower half of the window structure the guide channels 22 which are closed except for the inwardly directed narrow slot 21. Thus the guide channel 22 and the slot 21 combine to form a substantially L-shaped or angled guide in which a portion of one side of the lower screen structure, hereinafter described, is designed to slidably engage. The angular space above the strips 19 and 20, formed by the wall faces 12 and 14, is unobstructed and facilitates the placement in position in the upper part of the structure, of the lower screen frame so that the latter may be readily dropped into working position with portions extending through the slots 21 and slidably disposed in the vertical guides 22.

The upper and lower screen frames are designated 23 and 24 respectively and these frames are duplicates in certain details relating to the manner of securing the screen wire or a transparent panel in position therein, but are different in other respects as will be hereinafter made clear.

At the rearward side of the auxiliary frame structure there is secured in spaced parallel relation with the strip 15 of each side member 10, the flange strip 25 which borders the rear edge of the member 10 and extends inwardly in spaced parallel relation with the strips 15 and 16. As is clearly shown in Figures 2, 5 and 6, the strips 25 extend only from the sill or bottom portion 6 of the window frame upwardly through half the height of the frame, terminating substantially in the plane of the lower ends of the strips 16. There is thus provided at the inner side of each member 10 through the lower half thereof, the outwardly positioned lower channels 26 which receive opposite vertical edges of an outer auxiliary frame carrying either a screen or a glass pane, as hereinafter described.

Figure 5:
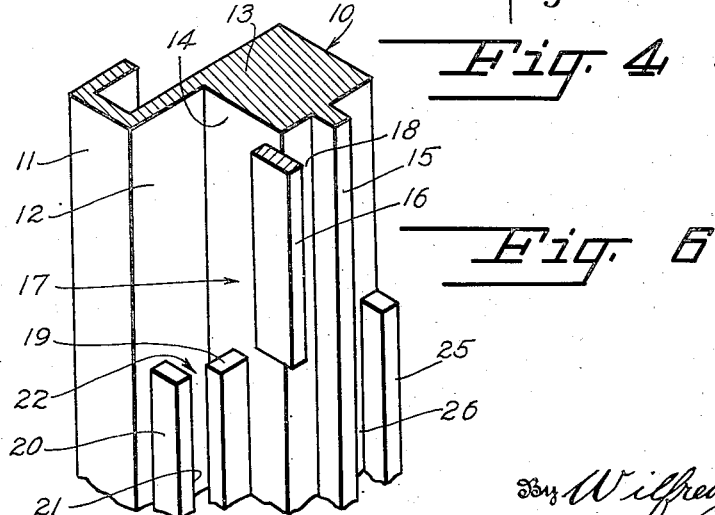
Figure 5 is a vertical section on the line 5—5 of Figure 4 showing the auxiliary sashes in position.

The upper auxiliary screen or window sash 23 is positioned in the upper part of the window frame with its opposite vertical edges in the channels 18 as shown in Figures 4 and 5. This sash structure includes the vertical side portions 27, the transverse top portion or top rail 28, and the transverse bottom portion or rail 29. The opening 30 of the sash is intended to receive either a screen unit such as that shown in Figure 10 and generally designated 31, or a glass unit of the same form and designed to fill the opening 30.

The screen and glass units are interchangeable in the upper and lower auxiliary sashes and in order to facilitate this interchangeability, the top rail 28 of the sash 23 is provided with the slot 32 and the inner edges of the side members 27 are channelled at 33 to receive the opposite edges of the inserted panel, either screen or glass.

The forward side of the top rail 28 of the sash frame 23 is provided with a keeper member 34 which is designed to be engaged by a suitable catch 35, fixed to the top of the window frame, when the auxiliary sash 23 is in position.

The lower or bottom rail 29 of the auxiliary sash 23 has extending throughout the major portion of its length, the forwardly directed flange or tongue 36 which co-operates with a corresponding part of the lower auxiliary sash 24, as hereinafter described, to establish an air and dust-proof joint between the upper and lower auxiliary sashes which are upon the forward side of the center parting strips 15.

The lower auxiliary sash 24, which is also designed to have either a glass panel or a screen panel placed therein, is, as clearly shown in Figure 4, of somewhat greater width than the co-operating upper sash 23 in that its side edges are positioned closely adjacent to the faces 12 of the vertical members 10 and slide in the slots 21.

This lower auxiliary sash frame 24 has the relatively wide vertical side members 37, the transverse top and bottom members 38 and 39, as shown in Figures 7 and 9. The side members 37 are bordered by the flanges 40 while the top transverse member is bordered throughout the major portion of its length by the outwardly directed flange 41. As shown in Figure 7 this flange 41 terminates at its ends short of the side flanges 40 to provide a space between the adjacent ends of the flanges for the strips 19. When this bottom sash frame is in position the relatively wide side members 37 extend through the slots 21 and the side flanges 40 position in the guides 22.

The opening of the lower sash frame 24 is designated 42 and this opening is here shown as having disposed over it the removable glass panel 43. This panel is maintained in position in a pocket forming frame 44 which is fixed to the forward side of the frame 24 and has the top slot 45 in which the panel 43 is inserted.

While the panel 43 is shown and described as being of glass it is to be understood that it may have substituted for it a screen panel such as that shown in Figure 10 and illustrated in connection with the upper frame 23.

In order that the glass or screen panels may be maintained firmly in position in their respective frames so as to avoid rattling, a suitable resilient holding means such as the strip of resilient corrugated metal or other suitable material, designated 46, is disposed within the channels of the frames in which the glass or screen panels are secured, as shown in Figure 9.

As previously stated the upper sash frame 23 is of materially less width than the lower sash frame 24. Accordingly in order to place the upper frame in position the lower window sash 9 is raised and the upper auxiliary sash frame 23 is disposed in position between the parts 13 of the members 10 so that it may be slid upwardly in the channels 18. Upon reaching its installed position in the top of the window structure the latch 35 will engage the keeper 34 to hold the upper auxiliary sash in position. Both window sashes 8 and 9 are now lowered and the lower auxiliary sash 24 is placed in position in the top of the window frame between the side faces 12 of the members 10. The lower auxiliary sash is then allowed to drop or move downwardly so as to engage the side portions 37 in the guide slots 21 as previously described. When it reaches its lowermost position the rearwardly directed flange 41 will engage upon the top of the forwardly directed flange 6 of the top auxiliary sash so as to form a tight joint between these two units.

A second lower auxiliary sash is provided, which is shown in Figure 5 and is generally designated 47. This sash is a substantial duplicate of the auxiliary sash 23 with the exception that it has the forwardly directed flange 48 at the top, which extends forwardly and contacts the rearward side of the upper auxiliary sash frame 23. Thus, as shown in Figure 5, the two lower auxiliary sashes 24 and 47 are tightly joined with the lower part of the upper auxiliary sash 23 so that there is provided at the adjacent edges of the three auxiliary sashes, an air and dust-proof joint and, when the auxiliary sashes are equipped with glass panels they will function effectively as storm shields in co-operation with the regular window sashes, forming a dead air space between the sashes which operates as an insulation means.

By reason of the novel arrangement of the guide strips upon the vertical auxiliary frame members 10 the upper and lower screen frames may be readily placed in position or removed from the structure from the forward or room side of the window.

While the present invention has been illustrated and described in connection with a double hung window it is to be understood that it may also be installed in windows of the dormer type without interference with the operation of the sashes thereof.

I claim:

1. An auxiliary window structure for a window frame mounted in a wall opening, comprising a unit within and extending vertically of the inner face of each of the two opposite sides of the opening frame and formed to provide guide channels, there being two cooperating opposing channels and two cooperating channels set farther apart across the width of the frame then the opposing channels, the opposing cooperating channels extended through the upper half length of the frame and comprising forwardly and rearwardly positioned, spaced strips, the opening of the channel being directed inward, the rearward strip being continued through the lower half length of the frame, a sash frame adapted to position between said units with opposite side edges slidably engaged in the opposing channels, and a second sash frame of greater width than the first sash frame and having means at its opposite sides adapted to slidably engage in the second mentioned two cooperating channels.

2. An auxiliary structure for a frame such as a window frame, comprising in combination with a window frame, means within the frame at each side thereof forming inwardly opening spaced channels, each of said channels having a forward and a rearward side throughout the upper half length of the frame and having its rearward side only continued through the lower half length of the frame, means extending through the lower half length of the frame upon the forward side, forming a pair of guide channels, said last mentioned guide channels being spaced apart across the width of the frame a greater distance than the first mentioned channels, the last mentioned channels each having an open upper end and each leading to a longitudinally extending slot directed toward the center of the frame, a sash frame of a width to be positioned between and with its opposite side edges slidably engaged in the first mentioned pair of channels, and a second sash frame having a width materially greater than the distance between the remote sides of the first mentioned channels and having a portion of each side edge formed for extension through said slots into the second mentioned channels.

3. The combination with a window structure including a frame, of a pair of auxiliary frame members each secured to an inner side of the window frame and extending the full height thereof, said members having opposed means forming guides for a sash frame, a sash frame adapted to have sliding engagement in said guides, means for inserting the sash frame into the guides in the lower part of the frame structure, means extending through the lower half length of the forward side of each of said frame members upon the side of the adjacent guide away from the center of the window frame forming a guide of substantially L-shaped cross section which is open at its top and along the side adjacent to the center of the window frame, and a sash frame of greater width than the first sash frame and having opposite side angled flanges for sliding engagement in the said L-shaped guides, portions of the said angled flanges lying in a plane extending across the width of the window through the side openings of the L-shaped guides.

ALBERT B. FUHR.

REFERENCES CITED

The following references are of record in the file of this patent:

UNITED STATES PATENTS

| Number | Name | Date |
|---|---|---|
| 688,737 | Jacques | Dec. 10, 1901 |
| 1,610,115 | White | Dec. 7, 1926 |
| 1,751,358 | Rice et al. | Mar. 18, 1930 |
| 1,946,169 | MacKenzie | Feb. 6, 1934 |
| 2,007,849 | Desmaris | July 9, 1935 |
| 2,292,273 | Kaufmann | Aug. 4, 1942 |
| 2,395,742 | Kammerer | Feb. 26, 1946 |